O. HEINS.
STARTING INTERNAL COMBUSTION ENGINES.
APPLICATION FILED OCT 28, 1912.
1,230,160.
Patented June 19, 1917.
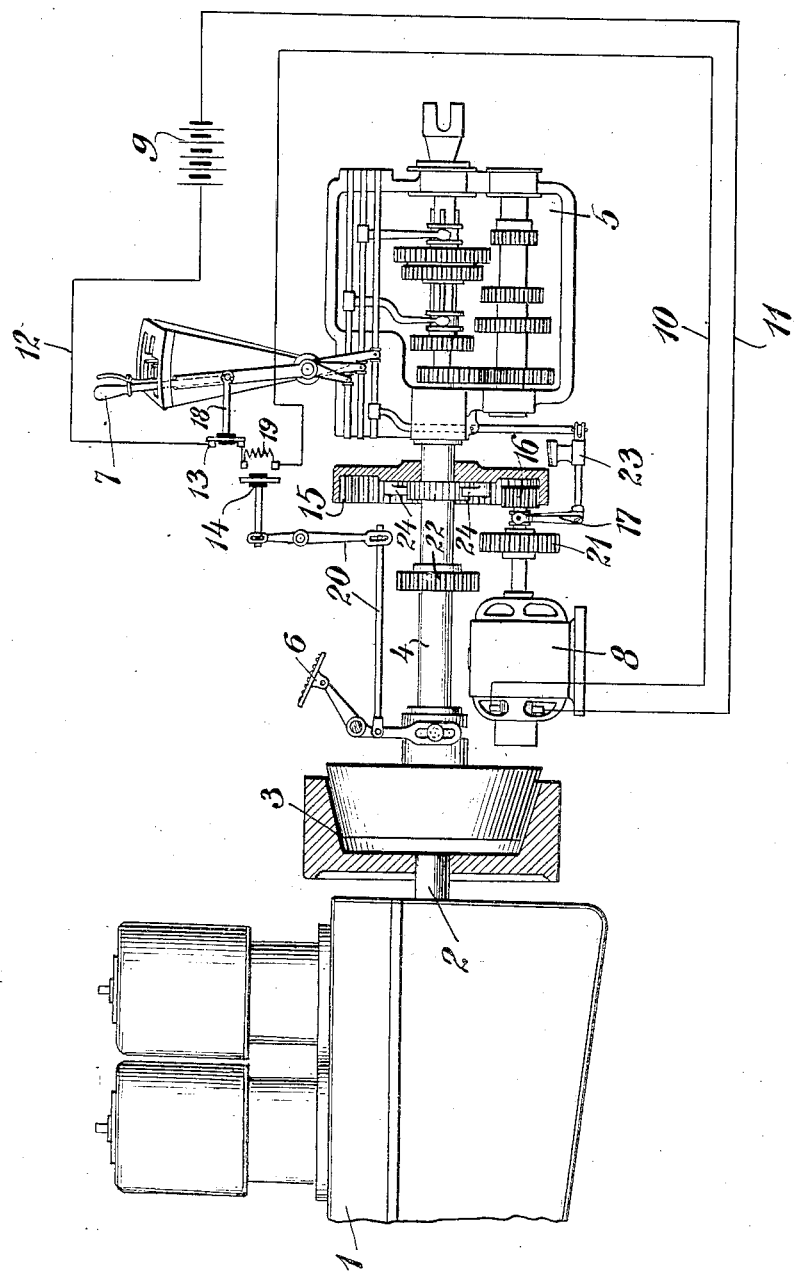
WITNESSES
Ji. A. Hennessy
M. A. Bill
INVENTOR
Otto Heins
BY
Pennie, Davis & Goldsborough
ATTORNEYS

UNITED STATES PATENT OFFICE.

OTTO HEINS, OF EDGEWATER, NEW JERSEY, ASSIGNOR TO BOSCH MAGNETO COMPANY, OF NEW YORK, N. Y., A CORPORATION OF NEW YORK.

STARTING INTERNAL-COMBUSTION ENGINES.

1,230,160.  Specification of Letters Patent.  Patented June 19, 1917.

Application filed October 23, 1912. Serial No. 726,164.

*To all whom it may concern:*

Be it known that I, OTTO HEINS, a citizen of the United States, residing in the town of Edgewater, county of Bergen, State of New Jersey, have invented certain new and useful Improvements in Starting Internal-Combustion Engines; and I do hereby declare the following to be a full, clear, and exact description of the invention, such as will enable others skilled in the art to which it appertains to make and use the same.

The present invention relates to a method of and apparatus for starting internal combustion engines from rest, to initiate the normal cycle of operations of the engine; and more specifically to a method and apparatus which embodies the idea of accumulating, in the form of kinetic energy, in a rotatable element disconnected from the engine, the effort of a motor of relatively small power output, and then utilizing the accumulated kinetic energy of rotation to assist the motor in starting the engine. Thus the effort of a relatively small motor operated preliminarily over a comparatively extended period is stored up and made available to develop, during a relatively short period of application, the comparatively large initial power required to start the engine. It is particularly advantageous, in carrying out this idea, to effect the starting of the engine by the joint and simultaneous action of the rotating mass and the starting motor, rather than to rely upon the kinetic energy of the rotating mass alone, and this is particularly true in view of the fact that it is often necessary, in starting an engine of this type, to turn the engine over several times before the normal cycle of operation is reliably established. Thus I have found in practice that when this procedure is followed the necessary assisting kinetic energy of rotation may be stored, for instance, in the rotating mass of the ordinary intermediate driving shaft of an automobile and the change-speed gears carried thereby, without increasing the speed of rotation of that shaft beyond that speed at which it is designed to operate under normal conditions.

When thus using one of the operating elements of the engine driven organization, such as the intermediate driving shaft of an automobile, as the rotatable element in which kinetic energy of rotation is accumulated, it is sometimes convenient, nevertheless, to increase the rotating mass during the starting period by the use of a weight disengageably associated with the rotatable element and arranged to be disconnected therefrom when the engine attains a predetermined speed under its own power and the operating element resumes its normal function in the engine-driven organization. In the particular embodiment of the invention hereinafter disclosed, this is effected by making use of a connecting gear between the starting motor of the desired weight and distribution of weight to materially add to the effective mass of the rotatable element, and by providing an over-running clutch between the said gear and the intermediate driving shaft of the automobile, or other like operating element of the motor-driven organization, to disconnect the gear therefrom when the engine reaches a predetermined speed under its own power.

Whether or not this specific organization is employed there will, in general, be provided means for automatically disconnecting the starting motor from the engine when the engine attains a predetermined speed under its own power.

A further extension of the broad inventive idea is shown in the preferred embodiment hereinafter more particularly disclosed, in accordance with which the power output of the motor effective on the rotating element is increased during the period in which the rotating element is connected to the engine to start it.

Furthermore, I prefer, although it is not essential, to associate with the speed-change lever common in internal combustion engine equipments, means for operatingly connecting the starting motor to and disconnecting it from the rotatable element, the arrangement being such that the motor and the rotatable element can never be operatively connected while work is being done by the engine. In this way the ideas disclosed herein may be incorporated in the equipment usually employed in the operation of internal combustion engines, with slight modification and without interfering with the normal function of the equipment to any detrimental extent.

In the accompanying drawing, illustrating the apparatus for carrying out the preferred method disclosed herein, I show an automobile equipment, and an electric motor for starting the internal combustion engine from rest, but it is to be understood that this use of the engine, and this particular driving source for starting the engine, do not in any way define the limits of application of my idea or represent any more than a typical example of arrangements of apparatus contemplated by me.

Referring to the drawing, 1 represents a portion of an internal combustion engine which may have any number of cylinders operating on any desired cycle, and which is supposed to represent any form of engine that has to be started. The shaft 2 of this engine carries one member of an ordinary mechanical clutch 3 for operatively connecting the engine to the intermediate driving shaft 4, which carries some special apparatus to be described hereinafter, in addition to the ordinary speed change gears in the gear box 5. In the position shown in the drawing, the clutch members are disconnected and the speed change gears are disengaged from the driving axle (not shown) of the automobile, so that the shaft 4 with the devices mounted upon it, is rotatable in suitable bearings as a disconnected element. The pedal 6 is adapted to be operated by the chauffeur, and is operatively connected to an axially slidable member of the usual form of cone clutch 3 for connecting the shaft 4 to the engine shaft and for disconnecting it therefrom; while the hand operated speed change lever 7 is provided for engaging and disengaging the speed change gears in the gear box 5 for the purpose of driving the automobile at variable speeds from the engine in the well known way.

The specific kind of source of driving power for rotating the shaft 4 as a disconnected element is not essential to my invention, but I show for this purpose an electric motor 8 which may be of any suitable type, but preferably a direct-current series-wound motor, owing to the characteristic high starting torque of this type of motor. Electric power is supplied to the motor from a battery 9 through an electrical circuit comprising the conductors 10, 11 and 12, and the switches 13 and 14.

The internal gear 15 having the desired weight and distribution of weight to materially add to the energy of rotation stored in the rotating parts during the starting operation of the engine, is loosely mounted upon the shaft 4, and is provided with an ordinary over-running clutch mechanism 24 for operatively connecting it to the shaft 4 when the gear 15 is driven from the motor, and which automatically disconnects the gear 15 from the shaft 4 when the engine has started and the shaft 4 is rotated thereby at a speed above the speed of the gear 15. The gear 16 is slidably mounted upon the shaft of the motor 8 in such manner as to continually rotate therewith and to be capable of being moved into and out of engagement with the gear 15. The mechanism for sliding the gear 16 along the motor shaft comprises a system of levers 17 actuated by the speed change lever 7, and so arranged that when this lever is in its neutral position, or one of its speed positions, the gears 15 and 16 are disengaged, while, when the lever is in the engine-starting position, as shown in the drawing, these gears are operatively engaged for driving the shaft 4 from the motor 8. The arm 23 is fastened to one of the levers 17 in such manner that when the gear 16 is being disengaged from the gear 15 the friction surface of the arm comes into contact with the gear 15 to hold it by friction against rotation from the shaft 4, thereby insuring the removal of this weight from the rotating element when the shaft 4 is being driven from the engine. The speed change lever 7 is also provided with a link 18 carrying the blade of switch 13 in such manner that when this lever is in its neutral position or one of its speed positions, the electrical circuit from the battery 9 to the motor 8 is open at this switch, while, when the lever is being shifted to the engine starting position, the gear 16 is first meshed with the gear 15, and then the electrical circuit is closed at this switch, whereupon the motor 8 speeds up the intermediate driving shaft 4. The links 20 are connected to the pedal 6 and to the blade of switch 14. When the members of clutch 3 are disengaged, the electrical resistance 19 is included in the circuit between the battery and the motor, but while the pedal is depressed to engage the members of the clutch 3, the blade of switch 14 is moved by this clutch operating mechanism to the switch terminals so as to short-circuit the resistance 19 and thereby increase the supply of electric power to the motor during this period.

Under the conditions prevailing in the application of this idea to automobiles, it is possible to use as the starting motor a dynamo electric machine of such size and capacity as will, when driven as a generator from the engine, have an electrical output sufficient for lighting the automobile and charging the battery, by making the gears 15 and 16, with such a speed-reducing ratio that the normal discharge of the battery, acting through the relatively small dynamo electric machine as a motor, will be able to impart the necessary speed of rotation to the rotatable element, at the same time making the weight and the distribution of weight of the rotatable element such that when driven at this speed, lower than the motor speed, an amount of energy of rotation may be stored in it sufficient to make possible the starting of the engine, by the combined action of the rotating mass and the small motor, without requiring a marked increase in the power output of the motor or in the discharge from the battery during the time when the motor and the rotatable element are connected to the engine to start it. The increase of the motor output effected during this period by removing the resistance 19 from the circuit to the motor, is such as to not markedly increase the power supply, and furthermore, this increase occurs only during the short interval between the operation of clutching together the shafts 2 and 4, and the time at which the engine speeds up under its own power to the predetermined speed of disconnection of the clutch mechanism 24.

The operation of the arrangement shown in the drawing, is as follows: When the engine is at rest, the speed change lever 7 is in its neutral position and the members of clutch 3 are disengaged, so that the shaft 4 is then disconnected from both the engine and from the driving axle of the automobile; also, the gears 15 and 16 are disengaged and the gear 15 is operatively connected to the shaft 4 through the clutch mechanism 24. Furthermore the electrical circuit between the battery 9 and the motor 8 is then interrupted at the switch 13. When it is desired to start the engine from rest to initiate the normal cycle of operations of the engine, the lever 7 is moved to the engine-starting position, whereby the gears 15 and 16 are first engaged and the electrical circuit between the motor 8 and the battery 9 then closed through the resistance 19. The rotatable element comprising the shaft 4 and the devices mounted upon it, are speeded up to the desired speed. The pedal 6 is then depressed to operatively connect the intermediate driving shaft 4 to the engine, and the resistance 19 is short-circuited by the blade of switch 14. The energy of rotation is then utilized in combination with an increased power output of the motor to turn the engine until the combustible mixture drawn into the cylinders of the engine is ignited by the ignition apparatus to bring about the normal cycle of operations of the engine. The engine increases in speed under its own power to the predetermined value at which the clutch mechanism 24 automatically disconnects the gear 15 from the shaft 4, whereupon the motor 8 is operatively disconnected from the rotating element. The lever 7 may then be shifted to its neutral position to interrupt the supply of electrical power to the motor at switch 13, and to disengage the gear 16 from the gear 15. As soon as the engine reaches its normal operating speed, the lever 7 may be shifted to engage the speed change gears in the gear box 5 to start the automobile in the well known way. As a result of this arrangement, the motor 8 can never drive the shaft 4 when that shaft is connected to the driving axle of the automobile, and the motor 8 can never be connected to the shaft 4 when the speed of the latter is above the value predetermined by the clutch mechanism 24. Furthermore, after the speed change lever 7 is brought to its neutral position, which is done after the engine is running under its own power and before the speed change gears are engaged, the large gear 15 is held against rotation from the shaft 4 so that the fly wheel effect of this shaft is then substantially the same as now prevails in such equipments.

In addition to starting the engine, the motor 8 may also be used as a generator driven from the shaft 4 to furnish current for lighting purposes, for charging the storage batteries on the automobile, and for electrical ignition for the engine if desired, the necessary field windings in addition to the series winding hereinbefore mentioned, together with the necessary circuits, control devices and voltage regulating apparatus suitable for these purposes, being provided according to arrangements well understood in the art. The gears 21 and 22 having a speed ratio suitable for driving the dynamo 8 from the shaft 4 when the engine is operating at its normal speed, are arranged to be engaged after the gears 15 and 16 are disengaged, and vice versa, by the same movement of the speed change lever 7, so that when the automobile is running the dynamo 8 is being driven from the shaft 4, to generate electrical power. If desired, the dynamo may be driven as a generator from the engine shaft 2.

Having thus described my invention, what I claim is:

1. The method of reducing the maximum power output required from a motor in starting an internal combustion engine from rest to initiate the normal cycle of operations of the engine, which consists in utilizing the motor to first rotate a separate rotatable element disconnected from the engine until a suitable amount of energy of rotation is stored in the rotating parts, and then increasing the power output of the motor and using the increased power output together with the stored energy to start the engine; substantially as described.

2. In apparatus for starting internal combustion engines from rest to initiate the normal cycle of operations thereof, a starting motor, a rotatable element in which the power output of the motor may be accumulated in the form of energy of rotation, a driving connection between the motor and the rotatable element, and means for simultaneously increasing the effective power output of the motor and connecting the motor and the rotating element to the engine to start it; substantially as described.

3. In apparatus for starting internal combustion engines from rest, a rotatable element effective at normal speed to store sufficient kinetic energy to form a substantial part of the power required to start the engine from rest, a clutch for connecting the rotatable element to the engine, a starting motor having a driving engagement with the rotatable element and adapted to rotate the latter at said normal speed, and power increasing means operative during the starting period to increase the effective output of the motor; substantially as described.

4. In apparatus for starting internal combustion engines from rest, a rotatable element effective at normal speed to store sufficient kinetic energy to form a substantial part of the power required to start the engine from rest, a starting motor, a driving connection between the motor and the rotatable element whereby the motor is adapted to rotate the latter at said normal speed, a clutch for operatively connecting the rotatable element to the engine while the rotatable element is being driven by the motor, and means operative upon clutching the rotatable element to the engine to increase the effective power output of the motor; substantially as described.

5. In apparatus for starting internal combustion engines from rest, an intermediate driving shaft 4, a starting motor, a disengageable driving connection between the motor and the shaft 4, a clutch for connecting the shaft 4 to the engine and for disconnecting it therefrom, and means automatically disconnecting the motor from the shaft 4 at all times that the speed of the latter is greater than a predetermined value; substantially as described.

6. In apparatus for starting internal combustion engines from rest, an electric motor, a source of electric power supply and electrical connections for furnishing power to the motor, a rotatable element effective at normal speed to store sufficient kinetic energy to form a substantial part of the power required to start the engine from rest, a driving connection between the motor and the rotatable element whereby the motor is adapted to rotate the latter at said normal speed, a clutch for operatively connecting the rotatable element to the engine and for disconnecting it therefrom, and clutch operating mechanism arranged to increase the power supply to the motor while the rotatable element is being clutched to the engine; substantially as described.

7. The combination with an organization comprising an internal combustion engine, apparatus to be driven thereby, an intermediate driving shaft, and mechanism adapted to connect the intermediate shaft to the engine and to the apparatus to be driven, or to disconnect it from the engine and from the apparatus to be driven; of mechanism for starting the internal combustion engine from rest to initiate the normal cycle of operation thereof, consisting of a starting motor, and a disengageable connection between the motor and the intermediate driving shaft, said disengageable connection automatically disconnecting the motor from the shaft at all times that the speed of the latter is greater than a predetermined value; substantially as described.

8. The combination with an organization comprising an internal combustion engine, apparatus to be driven thereby, an intermediate driving shaft, and mechanism adapted to connect the intermediate shaft to the engine and to the apparatus to be driven, or to disconnect it from the engine and from the apparatus to be driven; of mechanism for starting the internal combustion engine from rest to initiate the normal cycle of operation thereof, consisting of a starting motor and an auxiliary rotatable weight, and mechanism connecting the motor and the auxiliary weight to the intermediate shaft, said mechanism including an element which automatically disconnects the motor from the shaft at all times that the speed of the latter is greater than a predetermined value; substantially as described.

9. The combination with an organization comprising an internal combustion engine, apparatus to be driven thereby, an intermediate driving shaft, and mechanism adapted to connect the intermediate shaft to the engine and to the apparatus to be driven, or to disconnect it from the engine and from the apparatus to be driven; of mechanism for starting the internal combustion engine from rest to initiate the normal cycle of operation thereof, consisting of a starting motor, and mechanism including the speed reducing gearing between the motor and the intermediate driving shaft and also including an element which automatically disconnects the motor from the shaft at all times that the speed of the latter is greater than a predetermined value; substantially as described.

10. The combination with an internal combustion engine, an intermediate driving shaft, and a speed change lever, of apparatus for starting the engine from rest comprising a starting motor, a disengageable driving connection between the motor and the intermediate driving shaft, and transmission devices actuated by the lever to operatively connect and disconnect the motor and the intermediate driving shaft at the driving connection; substantially as described.

11. The combination with an internal combustion engine, and a speed change lever having a plurality of positions including a neutral position and also an engine starting position, of apparatus for starting the engine from rest comprising an electric motor, a source of electric power supply, circuit connections for supplying power from the source to the motor, and means for interrupting the supply of power to the motor when the lever is in other than the engine-starting position; substantially as described.

12. The combination with an internal combustion engine, an intermediate driving shaft, and a speed change lever having a plurality of positions including a neutral position and also an engine-starting position, of apparatus for starting the engine from rest comprising an electric motor, a source of electric power, circuit connections for supplying power from the source to the motor, a disengageable driving connection between the motor and the intermediate driving shaft, transmitting levers for connecting the motor to the intermediate driving shaft at the driving connection, and for closing the circuit connections to establish a supply of power to the motor when the lever is placed in the engine-starting position; substantially as described.

13. The combination with an internal combustion engine, an intermediate driving shaft effective at normal speed to store sufficient kinetic energy to form a substantial part of the power required to start the engine from rest, and a clutch for operatively connecting and disconnecting the engine and intermediate driving shaft, of apparatus for starting the engine from rest comprising an electric motor, a source of electric power, circuit connections including an electrical resistance for supplying the power to the motor, a driving connection between the motor and the intermediate driving shaft whereby the motor is adapted to rotate the latter at said normal speed, and clutch operating mechanism arranged to short-circuit the resistance when the intermediate driving shaft is being clutched to the engine; substantially as described.

14. The combination with an internal combustion engine, an intermediate driving shaft, a clutch for operatively connecting and disconnecting the engine and the intermediate driving shaft, and a speed change lever having a plurality of positions including an engine-starting position, of apparatus for starting the engine from rest comprising an electric motor, a source of electric power, circuit connections including an electrical resistance for supplying power to the motor, a disengageable driving connection between the motor and the intermediate driving shaft, transmitting levers for operatively connecting the motor to the intermediate driving shaft at the driving connection and for closing the circuit connection to establish a supply of power to the motor when the lever is placed in the engine-starting position, and clutch operating mechanism arranged to short-circuit the resistance when the intermediate driving shaft is being clutched to the engine; substantially as described.

In testimony whereof I affix my signature in presence of two witnesses.

OTTO HEINS.

Witnesses:
 Leon W. Rosenthal,
 M. A. Bill.